June 10, 1952
J. THOMAS
2,600,139
INSTRUMENT FOR SCRIBING CIRCULAR ARCS ON
A WORKPIECE ABOUT A FIXED CENTER
Filed Nov. 24, 1948
3 Sheets-Sheet 1
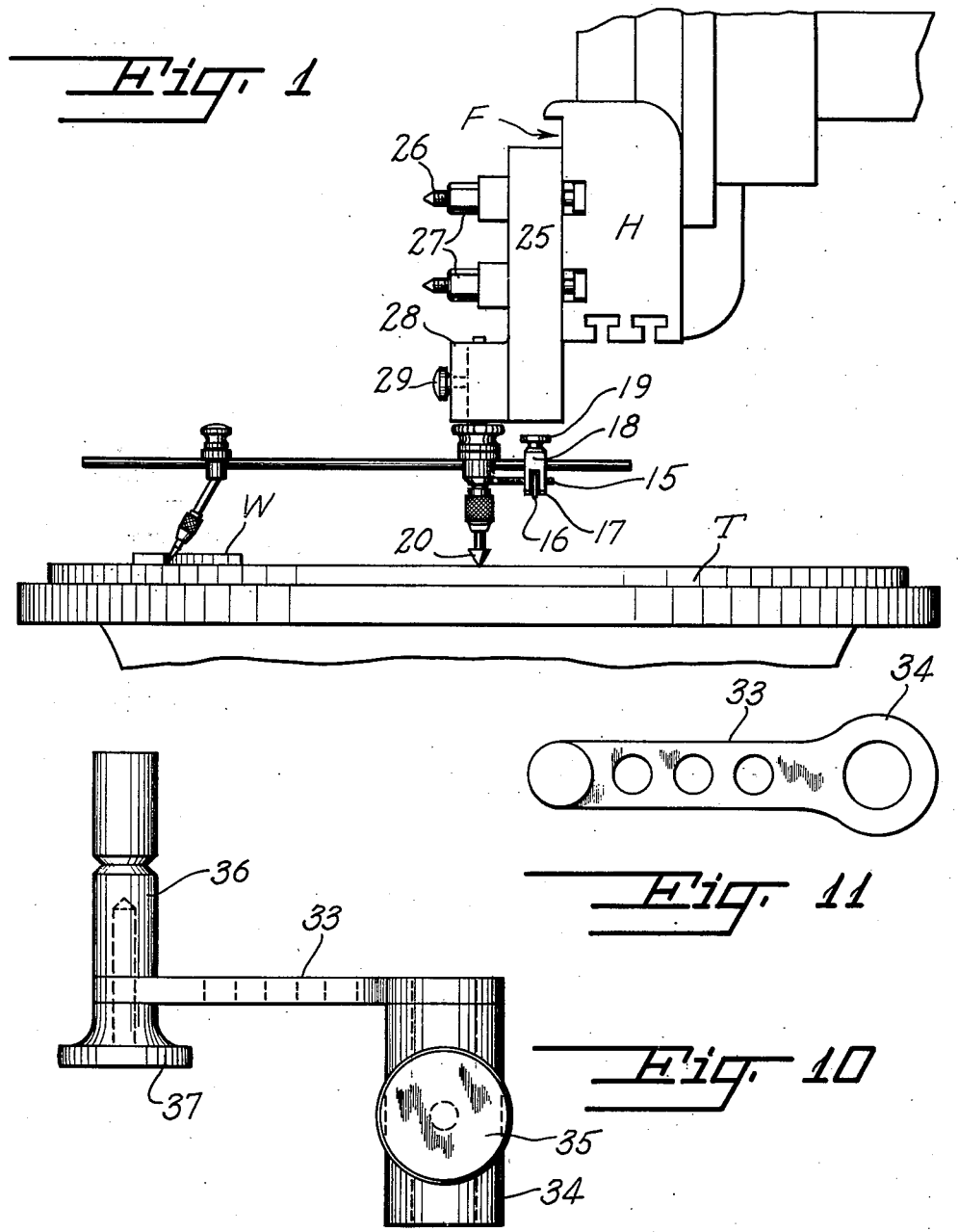
INVENTOR.
James Thomas
BY Victor J. Evans & Co.
ATTORNEYS

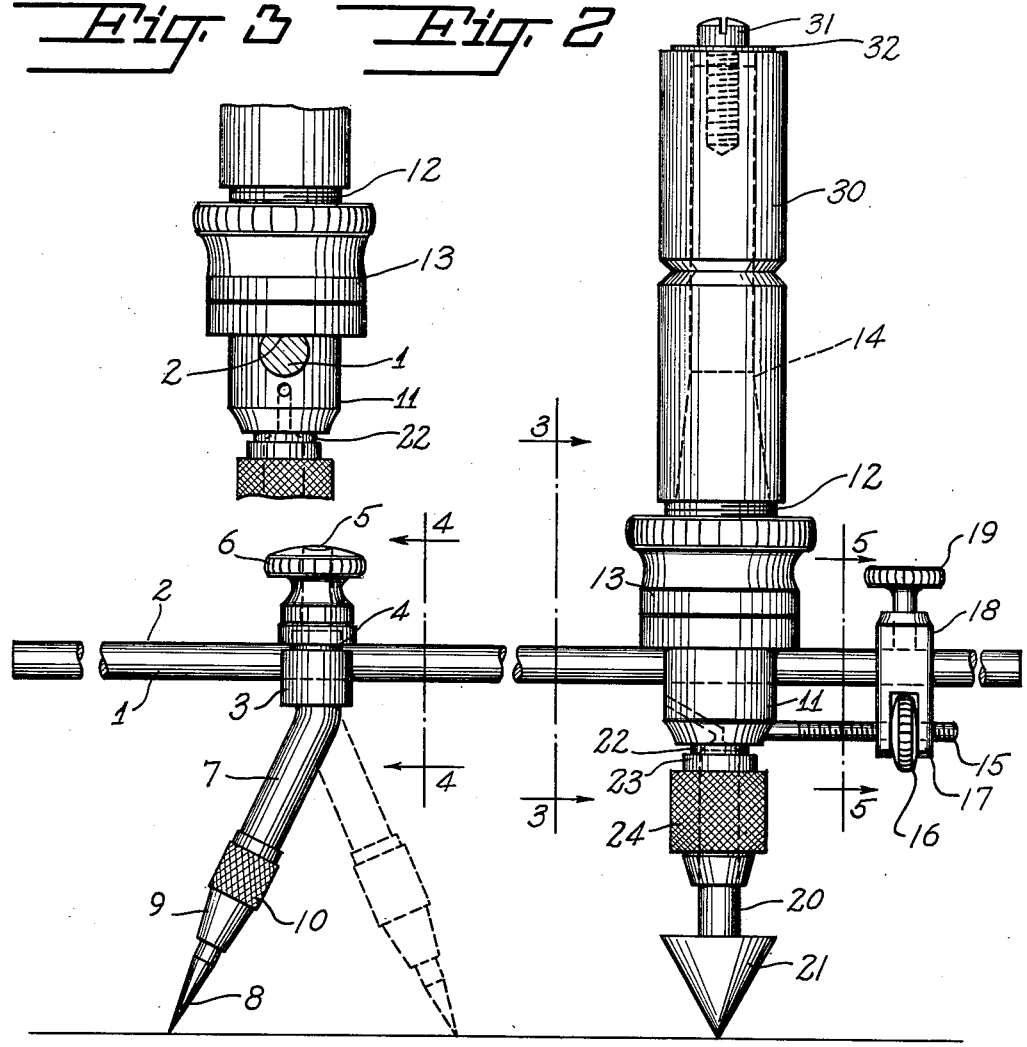
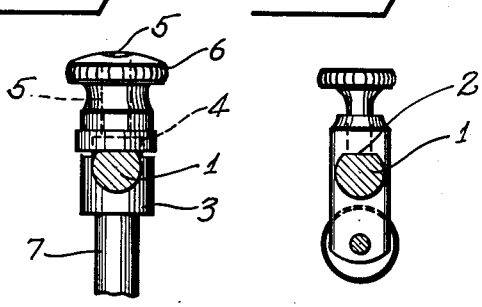

June 10, 1952 — J. THOMAS — 2,600,139
INSTRUMENT FOR SCRIBING CIRCULAR ARCS ON A WORKPIECE ABOUT A FIXED CENTER
Filed Nov. 24, 1948 — 3 Sheets-Sheet 3
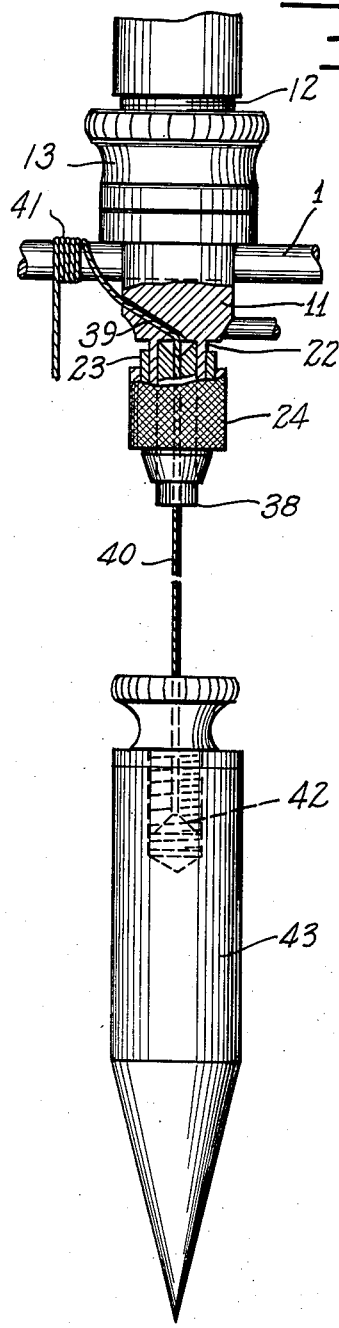
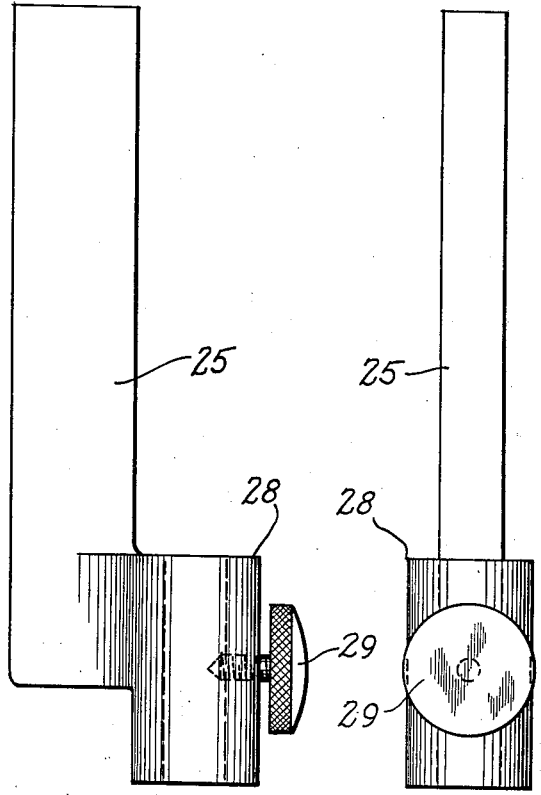
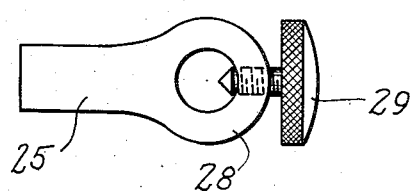
INVENTOR.
James Thomas
BY Victor J. Evans & Co.
ATTORNEYS Patented June 10, 1952

2,600,139

UNITED STATES PATENT OFFICE 2,600,139

INSTRUMENT FOR SCRIBING CIRCULAR ARCS ON A WORKPIECE ABOUT A FIXED CENTER

James Thomas, Berwick, Pa.

Application November 24, 1948, Serial No. 61,785

1 Claim. (Cl. 33—27)

My present invention relates to the general class of geometrical instruments of the circular distance-measuring and gauging type, employing a beam or trammel with an adjustable centering pin and an adjustable describing pointer, which is convertible for various purposes and uses, and more specifically to an improved instrument that is designed especially for use with milling machines, drill presses, lathes, slotted boring mills, and other machine tools, and also adapted for use on a work bench in manually laying and locating radii. For use with a machine tool the instrument is equipped with a set of interchangeable and selective adaptors forming swivel bearings for the single swivel pin of the instrument, and the adaptors are provided with means for attachment to the idle machine tool. The equipment for the instrument also includes other interchangeable parts for converting the instrument for a variety of uses, as for instance a plumb bob and line, or a beam compass, as well as for a circular cutter, marker, or scriber.

The instrument of my invention includes a minimum number of parts that may with facility be manufactured at low cost of production, and the parts may be assembled and interchanged with convenience, to assure a convertible instrument that may be employed with safety on an idle machine tool, and which is reliable and accurate in the efficient performance of its functions.

The invention consists in certain novel features of construction and combinations and arrangements of parts as will hereinafter be described and more particularly set forth in the appended claim.

In the accompanying drawings I have illustrated a complete example, and several modifications, of a physical embodiment of my invention, wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a view in side elevation showing the instrument adapted to the vertical front face of a slotter head, or similar machine tool; and Figure 2 is an enlarged elevation, with the beam or trammel broken away for convenience of illustration.

Figure 3 is a transverse vertical sectional view at line 3—3 of Fig. 2.

Figure 4 is a sectional view at line 4—4 of Fig. 2; and Figure 5 is a similar view at line 5—5 of Fig. 2.

Figure 6 is a fragmentary detail view partly in section showing the instrument used as a plumb line and bob.

Figure 7, Figure 8, and Figure 9, are enlarged detail views of the adaptor for a machine tool as illustrated in Fig. 1; and Figures 10 and 11, are detail views of another adaptor, for use on a boring mill or similar machine tool.

In order that the general arrangement and utility of parts may readily be understood I have indicated in Fig. 1 a slotter head H to the vertical front face F of which the instrument of my invention is adapted for locating a radius on the work W, which rests on the circular table T, while the machine tool is idle or not running. The instrument shown in horizontal position includes a solid cylindrical bar forming a beam or trammel 1 having a flat plane face 2, upon which a reversible and adjustable scriber, marker, or cutter, may be set in selected position.

The scriber or pointer in Figs. 1 and 3 is fashioned with a cylindrical head 3 and a reduced boss 4 having a transverse bore for slidable adjustment of the head on the beam, and the boss terminates in a further reduced stud screw or threaded stem 5 upon which a lock nut 6 is mounted for clamping the head in adjusted position on the beam. The head of the pointer, or similar tool, is fashioned with an oblique or angularly offset leg or shank 7, and an interchangeable and pointed pin 8 is clamped in a resilient tapered sleeve or holder 9, by means of a nut 10.

This assembly for a pointer, cutter, marker, or scriber is reversible for mounting on the beam, whereby the oblique leg varies the distance of the scriber from the centering point of the instrument to increase or decrease the radius of a circle in laying out and locating work, and the overall length of the instrument may thus be varied as indicated by dotted lines in Fig. 2.

A centering assembly for accurately locating and centering the instrument with relation to the exact center of the table T includes an adjustable centering head 11 having a transverse bore for slidable adjustment on the beam, and the head is fashioned with a threaded stem 12 upon which a lock nut 13 is mounted for clamping the head rigidly on the beam, and the threaded stem terminates, in a reduced partly tapered shank 14 that forms a swivel spindle or swivel pin that is adapted for selective use with a set of interchangeable adaptors or swivel bearings in converting the instrument for different purposes.

For precise and microscopic adjustment of the centering head on the beam or trammel 1, a screw bar or rod 15 is rigidly mounted in the head in parallelism with the beam, and a rotary traveling nut 16 on the screw bar is interposed between the forked or bifurcated end 17 of a setting head 18, and the setting head is equipped with a set screw 19 adapted to impinge on the flat face of the beam for rigidly holding the gauging device in adjusted position.

Interchangeable centering parts are adapted for use with the centering head in converting the instrument for various purposes, and as shown in Figs. 1 and 2, a centering pin 20 for coaction with the center point of the table T, is detachably mounted in a holder including a resilient sleeve 22 integral with the head 11 and depending therefrom, and a split resilient bushing 23 is provided with a lock nut 24 threaded on the bushing for clamping the centering pin in its holder.

In Fig. 1 where the implement is mounted against the front face of a slotter head, the adaptor 25 is attached to the head by means of bolts 26 and nuts 27, and the swivel pin or spindle 14 is detachably mounted in an offset swivel bearing, boss, or sleeve 28 of the adaptor, and when desired the swivel pin and its bearing may be rigidly united by a set screw 29.

In Fig. 2 where the instrument may be utilized as a beam compass, or it may be adapted for use with a milling machine or similar machine tool such as a drill press, the swivel spindle or pin 14 is mounted in an adaptor 30, and a tension screw 31 is passed through a spring washer 32 at the top of the adaptor and threaded into an axial bore of the spindle or swivel pin.

For use on a boring mill, an adaptor 33 is shown in Figs. 10 and 11, having a swivel bearing sleeve 34 and set screw 35, and an offset attaching stem 36 and set screw 37 for attachment to the machine tool.

In Fig. 6 the convertible instrument is illustrated as a plumbing and centering means from which the centering pin 20—21 is omitted, and a tubular guide 38 is substituted for the centering point.

The tubular guide or sleeve 38 is detachably inserted in the bushing 22 of the holder, and clamped by means of the lock nut 24, and the head 11 is drilled to form an inwardly extending bore 39 declining to the axial center of the centering assembly and the upper end of the guide sleeve to accommodate a plumb line 40 that is anchored to the beam as at 41, and the free end of the line below the guide sleeve is fixed in a socket 42 in the upper end of the plumb bob 43. By this arrangement of the instrument, the radius locator may be plumbed and centered in an elevated position above the center of the machine tool table T, preparatory to marking, scribing, or cutting, and gauging circular layouts, on the work W.

Having thus fully described my invention, what I claim as new and desire to secure by Letters Patent is:

In a radius locator, in combination, a solid cylindrical bar provided with an upper longitudinally extending flat plane face, a scriber adjustably mounted on said bar and including a cylindrical head having a boss provided with a transverse bore for slidably receiving said bar, said boss terminating in a threaded stem, a shank extending from said head and including a vertical section extending downwardly from said stem, said vertical section terminating in an inclined section, a resilient tapered sleeve arranged on the lower end of said shank, a pointer removably positioned in said sleeve, a knurled nut for maintaining said pointer in said sleeve, a centering instrument including an adjustable centering body member provided with a transverse bore for slidably receiving said bar, a threaded stem extending from said body member, a lock nut mounted on said last named stem and terminating in a swivel pin for attachment to an instrument, a centering pin arranged below said body member, means for clamping the centering pin in place, a screw rod arranged in spaced parallel relation with respect to said bar and having an end secured to said body member, a setting head mounted on said bar, a set screw extending through said setting head and engaging the flat face of said bar, said setting head being provided with a bifurcated end for the projection therethrough of said screw rod, and a traveling nut arranged in the bifurcated end of said setting head and mounted on said screw rod.

JAMES THOMAS.

REFERENCES CITED

The following references are of record in the file of this patent:

UNITED STATES PATENTS

| Number | Name | Date |
|---|---|---|
| 1,241,018 | Rawles | Sept. 25, 1917 |
| 1,994,497 | Winters | Mar. 19, 1935 |
| 2,355,585 | Halstead | Aug. 8, 1944 |
| 2,427,011 | London | Sept. 9, 1947 |

FOREIGN PATENTS

| Number | Country | Date |
|---|---|---|
| 23,570 | Great Britain | 1909 |
| 64,214 | Sweden | Nov. 29, 1927 |
| 151,213 | Germany | May 9, 1904 |
| 449,834 | France | Jan. 3, 1913 |